Jan. 14, 1969 W. F. NEWBOLD Re. 26,516

ELECTRONIC CONTROLLER

Original Filed Aug. 28, 1959

INVENTOR.
WILLIAM F. NEWBOLD
BY M. Michael Carpenter
ATTORNEY.

United States Patent Office

Re. 26,516
Reissued Jan. 14, 1969

26,516
ELECTRONIC CONTROLLER

William F. Newbold, Springfield Township, Pa., assignor to Honeywell Inc., a corporation of Delaware Original No. 3,081,425, dated Mar. 12, 1963, Ser. No. 836,716, Aug. 28, 1959. Application for reissue Nov. 1, 1967, Ser. No. 689,742
U.S. Cl. 323—22 16 Claims
Int. Cl. G05f *1/00;* G05f *1/40;* H03b *3/04*

Matter enclosed in heavy brackets [ ] appears in the original patent but forms no part of this reissue specification; matter printed in italics indicates the additions made by reissue.

*ABSTRACT OF THE DISCLOSURE*

*An electronic controller having an amplifier with an internal feedback loop which includes a bridge circuit. An input signal, applied through an input circuit, unbalances the bridge for causing the amplifier to oscillate with an amplitude which is a function of the magnitude of the input signal. The amplifier oscillatory signal is rectified and applied to an output circuit including computer circuitry which effects the desired characterization of the output signal in combination with a feedback loop connecting the output circuit to the input circuit in a current summing operational amplifier configuration. The output circuit connects to a load device for achieving three mode electronic control of the load including the modes of proportional band, rate, and reset. The feedback loop is arranged to further characterize the rate mode by shunting from the loop a portion of the feedback signal applied therethrough as a function of the rate of change of the output signal.*

Figure 1:
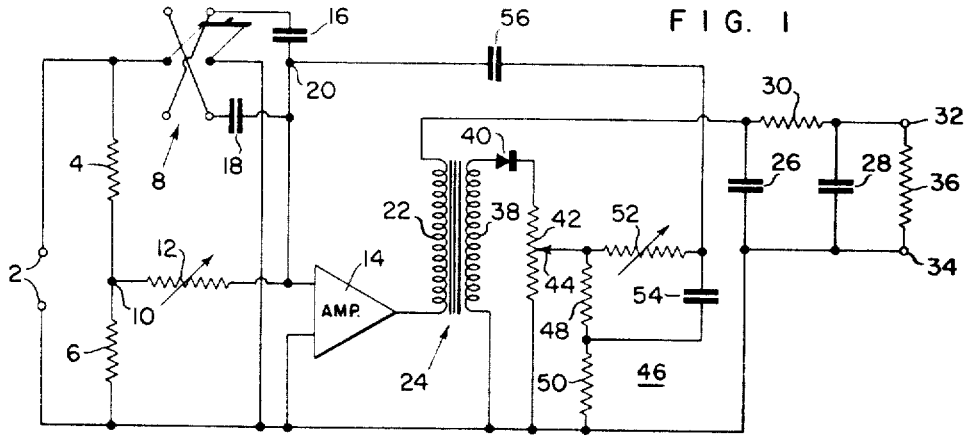

This invention relates to electronic apparatus, and more particularly to automatic electronic control apparatus.

In the art relating to industrial process control, there have been heretofore provided numerous control systems involving pneumatic controllers, electric controllers, and controllers which involve elements of both. In a number of instances the preference and requirement is for an electric controller. Many of the heretofore presented electric controllers involve the use of mechanically movable elements to effect the desired characterization of the control signal. In some instances the mechanical movements have proven to impose undesired limitations in control systems. The demand is now more frequently made for all-electronic control systems.

It is, accordingly, an object of the present invention to provide an improved all-electronic controller which features the characterization of the control signal typical of controllers.

It is a further object of the present invention to provide an improved controller as set forth which includes no mechanically movable elements as a part of the control function.

In automatic-controllers, there is frequently included one or more of the three modes of characterizing the control signal. These three modes includes a proportionality factor, known as proportional band, which may be considered as a function of the ratio of full-scale swing of the output signal to the deviation of the input signal; a time rate of change factor of the input signal, known as a rate function, which may be considered as a means for producing an output signal which is a function of the rate of change of the input signal; and a time integration factor, known as a reset function, which may be considered as a characterization of the output signal in accordance with the time integral of the input signal. In certain [type] *types* of processes one range of proportional band and reset function is required while in other processes a substantially different range of proportional band and reset function is required. Heretofore, electric controllers were designed to operate in one of these ranges or the other; and conversion from one range to the other required major modifications of the circuit elements.

It is a still further object of the present invention to provide an improved all-electric universal controller which features a wide range of operation and which also features simplifier conversion from one range of characterization to another.

In accomplishing these and other objects there has been provided, in accordance with the present invention, an all-electronic controller which includes a transistor amplifier. The amplifier has a feedback loop which includes a bridge circuit. The feedback may be positive or negative depending upon the direction of the unbalance of the bridge. Input signals are applied to the bridge to affect the balance thereof. When the feedback is positive the amplifier oscillates with an amplitude which is a function of magnitude of the bridge unbalance. This oscillatory signal is rectified and taken as the output signal. A portion of the signal, rectified, is applied to a novel computer circuit which includes means for effecting the desired characterization of the output signal and which circuit is connected at least in part as a system feedback circuit. This circuit is so constituted that the ranges of characterization of the signal is changed between two desired ranges by the simple expedient of interchanging the position of two capacitors.

Figure 2:
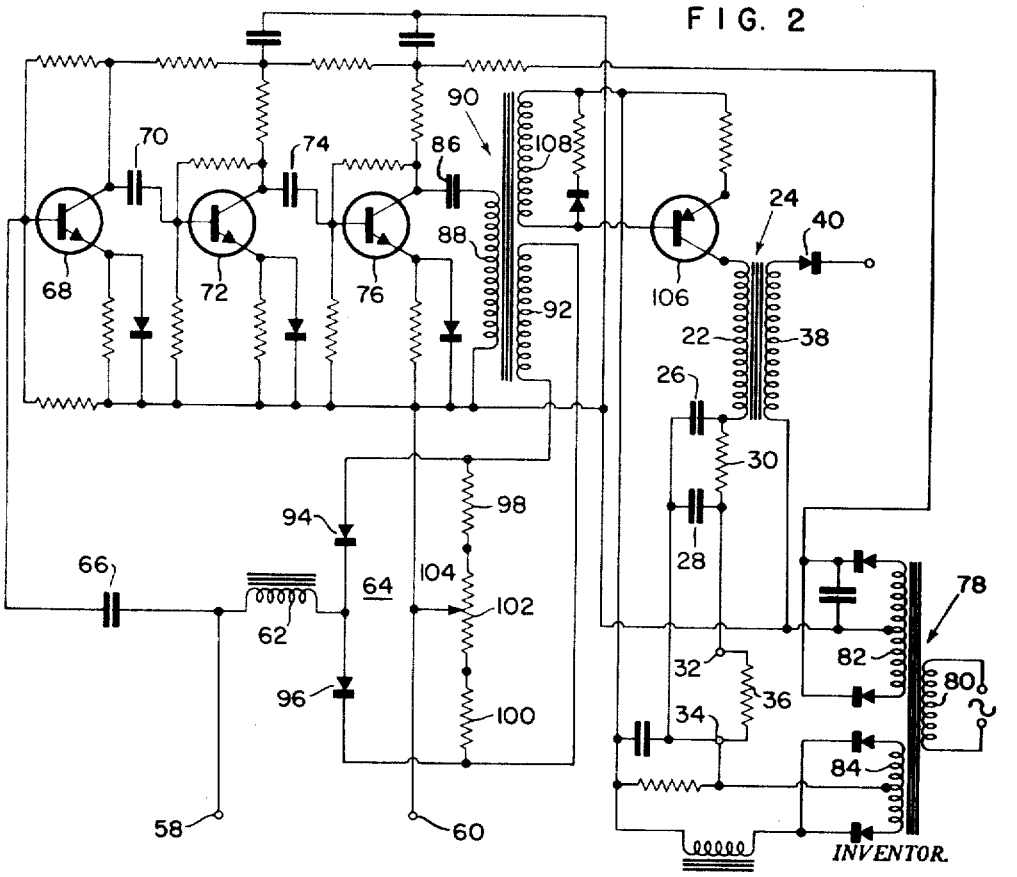

A better understanding of this invention may be had from the following detailed description when considered with the accompanying drawing, in which:

FIG. 1 is a schematic representation of a controller embodying the present invention, and FIG. 2 is a schematic circuit diagram of an amplifier suitable for use in the controller illustrated in FIG. 1.

Referring now to the drawing in more detail, it may be seen in FIG. 1 that there has been provided a controller having a pair of input terminals 2. A pair of attenuating resistors 4 and 6 are serially connected between the two terminals. The upper end of the resistors 4 is connected to one of the center terminals of a reversing switch 8. The other of the center terminals of the reversing switch is connected to the system common to which the lower end of the resistors 6 is also connected. The junction 10 between the resistors 4 and 6 is connected through a variable resistor 12 to one input terminal of an amplifier 14. The other input terminal of the amplifier 14 is connected to the system common. One of the extreme terminals of the reversing switch 8 is connected to one electrode of a capacitor 16 while the other extreme terminal of the reversing switch 8 is connected to one electrode of a capacitor 18. The opposite electrodes of both of these capacitors are connected at a junction 20. The junction 20 is also connected to the first mentioned input terminal of the amplifier 14. The output of the amplifier 14 is fed through a primary winding 22 of a transformer 24 to an output circuit. The output circuit includes a pi-section filter comprising capacitors 26, 28 and series resistor 30 and a pair of output terminals 32 and 34 between which is connected a utilization device represented by the load resistor 36.

A secondary winding 38 of the transformer 24 has induced therein a current proportional to the output signal. This current is rectified by a diode 40 and fed through a slidewire resistor 42. A slider 44 picks off a portion of a voltage developed across the slidewire resistor 42 and applies it to what will be identified as a rate circuit 46. The rate circuit 46 includes a pair of voltage dividing resistors 48 and 50 serially connected between the slider 44 and the system common. The slider 44 also is connected to one end of a variable resistor 52. A capacitor 54 is connected between the end of the resistor 52 opposite from the slider and the junction between the resistors 48 and 50. The junction between the resistor 52 and the capacitor 54 is connected through a feedback capacitor 56 to the junction 20.

An amplifier suitable for use in the system illustrated in FIG. 1 is shown in FIG. 2. [Th] *The* amplifier includes a pair of input terminals 58 and 60. The first of these terminals 58 is connected, through an inductor 62 to one corner of an impedance bridge 64. The other terminal 60 is connected to the opposite corner of the bridge 64 and to the system common. The input terminal 58 corresponds to that terminal of the amplifier 14 of FIG. 1 which is connected to the junction 20. The terminal 58 is also connected, through a D.C. blocking capacitor 66, to the first stage of the active portion of the amplifier. This includes a first transistor 68 coupled through a coupling capacitor 70 to a second stage transistor 72. The second transistor 72 is similarly connected through a coupling capacitor 74 to a third stage transistor 76.

Each of these three transistors is suitably energized from a power supply including an input transformer 78 having a primary winding 80 and a first secondary winding 82 and a second secondary winding 84. The secondary winding 82 is provided with suitable rectifiers and filters to provide the desired D.C. energizing current. Each of the transistors is also provided with suitable biasing means to establish the desired operating conditions.

The output of the third transistor 76 is connected, through a coupling capacitor 86, to the primary winding 88 of a transformer 90. A first secondary winding 92 on the transformer 90 is connected to the corners of the impedance bridge 64 intermediate the corners thereof to which the input terminals were connected. The bridge itself comprises a pair of diodes 94, 96 as the elements in two adjacent legs of the bridge while a pair of resistors 98, 100 are the elements in the other two legs. A slidewire resistor 102 is connected between the resistors 98 and 100, the slider 104 of which determines the corner of the bridge which is connected to the input terminals 60. The impedance characteristic of the two legs of the bridge having the resistors as the elements thereof is, of course, resistive. The other two legs of the bridge, however, are arranged such that the diodes appear as a pair of capacitors, the capacitances of which are variable in response to the magnitude of an applied bias voltage.

In operation, the bridge 64 is normally adjusted to provide a measure of positive or regenerative feedback to the input of the transistor amplifier. This causes the amplifier to oscillate at a frequency determined by the interrelationship of the various circuit parameters, including the inductor 62. In one system constructed in accordance with the present invention, the frequency of oscillation was on the order of 30 kilocycles/second. The amplitude of the oscillatory signal applied to the primary winding 88 of the transformer 90 will be of a predetermined and substantially constant amplitude. If a signal of one polarity is applied to the input terminals 58 and 60 of the bridge 64, the capacitance of the diodes 94 and 96 will be changed thereby. This, in turn, changes the unbalance condition of the bridge, thereby changing the feedback relationship of the amplifier. If the signal applied to the input to the bridge is in a direction to increase the positive feedback, the amplitude of the signal applied to the primary 88 of the transformer 90 is correspondingly increased. On the other hand, if the signal applied to the input terminals of the bridge 64 is in a direction to decrease the positive feedback, the amplitude of the signal applied to the primary winding 88 of the transformer 90 is correspondingly decreased.

The output circuit of the amplifier may now be considered. This includes an output stage power transistor 106, the input of which is connected to a second secondary winding 108 on the transformer 90. The output of the power stage transistor 106 is connected in a series circuit which includes the primary winding 22 of the transformer 24, shown in FIG. 1, the resistor 30 of the pi-section filter, the output or load device represented by the resistor 36, and the power supply means which includes the winding 84 of the transformer 80. As may be seen, the average current flowing in the output circuit of the transistor 106 is controlled by the amplitude of the signal applied to the input thereof from the transformer 90. The transistor 106, in addition to being a power amplifier stage, also serves as a half-wave rectifier. The half-wave rectified signal produced thereby is coupled through the transformer 24 to the feedback circuit as described in connection with FIG. 1. Since the transistor 106 serves as a half-wave rectifier, the resultant signal, when filtered, as by the pi-section filter represented by the capacitors 26, 28 and the resistor 30, produces a direct current signal for application to the load device represented by the resistor 36. It will, of course, be appreciated that the load device may be any suitable current responsive device such as, for example, a valve actuator motor. The signal applied to the load device 36 will bear a direct relationship to the output signal of the power transistor 106. One significant feature about the amplifier just described is that it is characterized by an extremely high input impedance.

With the foregoing in mind, the operation of the controller action may now be considered. First it is noted that the resistance of the resistor 4 is about five times as great as the resistance of the resistor 6. This provides an attenuation, under steady state condition, of the input signal to one-sixth of that appearing across the input terminals. Similarly, the capacitance of the capacitor 16 is on the order of ten times that of the feedback capacitor 56 while the capacitor 18 is of substantially the same capacitance as that of the feedback capacitor 56. The significance of these relationships will appear hereinafter. Assume that the switch 8 is closed in the lower position such that the capacitor 16 is connected to the upper input terminal 2 and the capacitor 18 is connected to the system common.

An initial condition to be encountered in the operation of such a controller is the condition of process start-up. Under this condition the signal applied to the input terminals 2 is a maximum. This signal is usually an "error" signal which is determined by the difference between a measured process variable and a desired or set-point signal. At start-up, the set point signal is fixed and the measured variable is at a minimum, leaving the difference or error signal at a maximum. This applies full input signal to the input of the controller, causing the amplifier to deliver full or maximum signal to the output circuit. When the starting transients have settled out, it will be found that the voltage signal applied to the input of the amplifier 14, that is the potential at the junction 20, is essentially one-sixth of the total error signal applied to the input terminals 2.

In controllers of this type, it is at least highly desirable, if not necessary, that the controller be capable of taking over control of the process early enough in the start-up to prevent the process from overshooting the control point. Since the amplifier is a high gain amplifier, the large input signal drives the amplifier into saturation, that is, the input signal tends to demand a larger output signal than the amplifier is capable of delivering. The arrangement of the input capacitor 16 and the feedback capacitor 56 corresponds to the circuit configuration known as an operational amplifier. In this configuration, the feedback signal opposes the input signal tending to reduce the signal applied to the amplifier to substantially zero. However, with the amplifier operating under saturation conditions, the feedback fails to meet the input demand, resulting in the feedback capacitor 56 being charged to the potential of the amplifier input signal. Since the amplifier has an extremely high input impedance, the charge on the feedback capacitor will remain until the polarity of the signal applied to the junction 20 is reversed. Under this condition, the amplifier is insensitive to changes in input signal until the polarity of the signal applied to input to the amplifier is reversed.

It will be recalled that the error signal was attenuated to one-sixth of the full value before application to the input of the amplifier. Accordingly, the potential at the junction 20 is one-sixth of the error signal. Assuming, for reference, that the error signal is 10 volts, the potential appearing at the junction 20 is 1⅔ volts. Now, if the process to be controlled starts approaching the desired operating condition, the error signal is diminished accordingly. Let us assume that the error signal is reduced to 8 volts. This would be a 2 volt drop in the signal. If the 2 volt drop is, as a limiting condition, a step change, substantially the entire 2 volt change is transferred across the capacitor 16 and appears at the junction 20. It is to be noted that this change is more than enough to reverse the polarity of the signal applied to the input of the amplifier. This permits the controller to come out of saturation and take over control of the process. It can be shown that if the change in error signal is something less than a step change, the changing signal will still be transmitted across the capacitor 16 such that the polarity of the signal in the input to the amplifier would be reversed long before the error signal was reduced to zero. It might also be noted that a similar operation during start-up would prevail of the switch 8 were to be reversed and the caapcitor 18 connected in the input circuit.

The control action of the system may now be considered. As pointed out above, the general configuration of the system is that of an operational amplifier. One of the characteristics of such a configuration is that the net gain of the system is determined by the ratio of the feedback impedance to the input impedance so long as the open loop gain of the amplifier is high. The controller is arranged to vary the signal applied to the output terminals between a predetermined minimum and maximum signal. The difference between these two signals is, of course, the range of the output signal. This corresponds to the full scale operation of the utilization device; if, for example, the output device is a valve actuator, the range of output signals might be such as to cause the actuator to move the associated valve between a fully opened and a fully closed position.

Similarly, the ssytem is adapted to accept a predetermined limited range of input error signals, usually with zero signal at the center of the range. The zero at the center corresponds to a coincidence of the measured variable and the set-point or desired value.

The proportional band may be defined as that portion of range of input signals necessary to cause the output signals to traverse its full range. For example, if a full scale swing of the input signal causes a full range operation of the output signal, the system is said to be operating at 100% proportional band. If a 50% swing of the input signal causes a full range operation of the output signal the system is operating at 50% proportional band. On the other hand, if a full range change in the input signal causes only a 50% change in the output signal, the system is operating at 200% proportional band.

Referring now back to FIG. 1, the circuit parameters are such that, with the switch 8 closed in the lower position, that is with the caapcitor 16 in the input circuit, and the slider 44 at the top of the slidewire resistor 42, the system will operate at 100% proportional band. By moving the slider 44 down the resistor 42 toward the system common, a smaller portion of the output signal is applied as feedback to the amplifier. This, in effect, changes the relationship between the input and the feedback such that something less than a full scale change in input signal causes a full range change in the output signal, it being recalled that in the operational amplifier the input signal and the feedback signal sum to substantially zero at the junction 20. With this arrangement, the proportional band adjustment of the system corresponds to the position of the slider 44 along the resistor 42. With the slider at the top of the resistor, as previously mentioned, the system operates at 100% proportional band. As the slider approaches the bottom of the resistor 42, the proportional band adjustment of the system can be controlled accurately down to about that position which corresponds to 1% proportional band of the system.

It will be recalled that the capacitor 16 was described as having capacitance of ten times that of the capacitor 56 or that of the capacitor 18. With the larger capacitor connected in the input, the system, in accordance with operational amplifier principles, exhibits a net gain of ten. This is the arrangement which produces the proportional band range from 1 to 100%. Assume, now that the slider is in the 100% position, and the switch 8 is reversed. This arrangement now puts the capacitor 18, which is equal in capacitance to the capacitor 56, in the input circuit. With the input impedance equal to the feedback impedance, the system has now a net gain of unity. This, in turn, changes the proportional band relationship by a factor of ten. Whereas the proportional band adjustments, with the slider 44 at the top of the resistor 42, was 100% it now appears as 100%. That is, a full scale deviation of the input signal would produce only a 10% variation in the output signal. As the slider 44 is moved down the resistor 42 to the point whereat the proportional band setting has been 1%, we now find operation at 10%. Thus it may be seen that there have been provided two distinct ranges of proportional band settings that have an areas of overlap and present in a single instrument an available band spread to cover any presently known demand.

So far as rate action is concerned, the means providing this function are placed in a position other than that normally considered proper. The means providing the rate action are usually placed ahead of the amplifier, that is between the input signal source and the amplifier. This arrangement has heretofore been felt to be required in order to provide proper start-up action of the controller. Conventionally, in controllers involving three-mode operation, it is felt that the rate action must precede the rest action in order that a large rate signal may overcome the stored rest signal, allowing the controller to come out of saturation before the set point is reached. As herein before discussed, the present controller does not require the rate action before the reset to provide proper start-up.

Since it is desirable, in many cases, to have a relatively large rate signal, it becomes necessary to provide amplification of the signal before the development of the actual rate signal. In the present system, the rate circuit is placed atfer the amplifier 14 and in the feedback loop.

In this manner a separate rate amplifier is not needed. Since the rate circuit is in the feedback loop, a conventional differentiator circuit may not be used. It will be recalled that the feedback loop provides a large negative feedback signal which limits the net gain of the circuit. In the event of a signal change such as would bring the rate circuit into play, a step signal input, for example, the rate circuit should produce a large pulse signal output of such polarity as to correct the condition that produced the change. Without the rate circuit, the step input signal would be met by an instantaneous negative feedback signal which would prevent the desired appearance of the signal in the output apparatus.

In the present circuit, however, the capacitor 54 provides a shunt path for the output step signal so far as the feedback is concerned. So much of the signal as appears across the *variable resistor 52* [capacitor 54] is not applied as negative feedback to the amplifier *but is shunted by the capacitor 54*. The shunt path of the capacitor 54 also includes the voltage dividing resistors *48* [45] and 50. These limit the magnitude of the shunt signal that will be passed by the capacitor 54 and thus, in effect, limit the amplitude of the rate signal developed, thus defining the rate amplitude of the controller output signal. [Also in the rate circuit is the variable resistor 52.] Continuing the example of the input signal change, as the step occurs, the signal is, at least in part, shunted by the capacitor 54. However, as the signal continues, the capacitor 54 charges through the resistor 52. This produces a decay in the amount of the signal shunted by the capacitor 54. As this decay takes place, the negative feedback signal increases, reducing the net output signal accordingly. The time of the decay is determined by the magnitudes of the capacitor 54 and the resistor 52. Since the size of the capacitor 54 is fixed, adjustment of the rate of time is accomplished by the adjustment of the resistor. Thus, it may be seen that characteristic rate action is obtainable with the present novel circuit.

*Continuing the foregoing, it will also be seen that the rate action of the controller output signal obtainable with the present circuit includes rate amplitude and rate of time. That is, rate amplitude is the magnitude of the controller output signal during rate action and rate of time is the duration of the controller output signal during rate action. As described above, the rate of time of the rate action signal is adjusted by adjusting the resistor 52. It should be noted that the adjustment of the rate of time does not affect the rate amplitude of the controller output signal. This is due to the fact that the negative feedback signal which is shunted through the capacitor 54 is passed through the resistor 50 of the voltage dividing resistors 48 and 50 before being shunted to the system common. As the values of voltage dividing resistors 48 and 50 are fixed, the portion of the signal shunted from the feedback loop by this limiting arrangement is also fixed with respect to the value of the signal which is passed through the proportional band slider 44 and slidewire resistor 42. This relationship remains fixed regardless of the adjustment of the resistor 52. Thus, there is provided within the present novel circuit a rate action in which the rate of time may be adjusted while the rate amplitude remains limited by fixed resistors.*

In considering the reset action, consider the switch 8 in the lower position with the capacitor 16 in the input circuit. As was previously discussed, with the amplifier 14 connected in an operational amplifier configuration, the feedback tends to hold the junction 20, the input to the amplifier 14, at substantially zero under steady state conditions. Assume now a change in the input signal, this change is applied to the capacitor 16 causing charging current to flow into it, producing a signal at the input of the amplifier 14. This signal on the input to the amplifier 14 causes a change in the amplifier output which in turn causes charging current to flow in the feedback capacitor 56. Without the reset action, as soon as the charges on the two capacitors balanced, no charging current flows. If the input or error signal had been a change such as a step-change, with an initial change and a continuing at the new level, the mere proportional action of the system would cause the process to level out at a level which did not necessarily match the set point. The reset action is employed to prevent this type of action. The reset function produces a signal at the input to the amplifier so long as there is a deviation between the measured process variable and the control or set-point. This is accomplished, in the present case, by connecting the large variable resistor 12 in shunt with the input capacitor. With this resistor in the circuit, some current will flow in the input circuit of the amplifier 14 so long as there is any signal at all on the input terminal 2. So long as current flows in the amplifier input circuit, the amplifier output must continue to increase in an effort to offset the signal at the input thereof. This increasing signal appears at the output terminals 32–34, and is applied to the current responsive output device 36. The changing signal applied to the device 36, which may be a valve actuator, for example, changes the control over the process in a direction to reduce the input error signal toward zero. The changing of the signal, as mentioned, occurs at a rate determined by the R-C time constant of the circuit including the input capacitor, the resistor 12, and the voltage divider resistors 4 and 6. In one circuit constructed in accordance with the invention, reset rates variable between ten repeats per minute and .01 repeats per minute were obtained.

If, now, the switch 8 is thrown to its other position it is found that the capacitor 18 is now in the reset rate determining circuit instead of the capacitor 16. Since the capacitor 18 differs from the capacitor 16 by a factor of ten, the reset rate obtained differs from that previously mentioned by a factor of ten. Thus, in the previously mentioned constructed embodiment of this invention, with the capacitor 18 in the input circuit, reset rates variable between one hundred and one-tenth repeats per minute. In both of these ranges, the variations are obtained by adjusting the resistance of the reset resistor 12.

Up to this point, in considering the operation of the switch 8 and the capacitors 16 and 18, consideration has been given only to whichever of the capacitors was included in the input circuit. It will be recalled that in the description of the circuit, given hereinbefore, one center terminal of the reversing switch was connected to one of the input terminals 2 while the other center terminal of the switch 8 was connected to the system common. With this arrangement, when one of the capacitors 16 or 18 is connected to the input circuit, the other is connected between the junction 20 and the system common, that is, the other one is connected in shunt across the input terminals of the amplifier 14.

It will also be recalled that with the larger capacitors 16 in the input circuit, the controller exhibited a loop or net gain of ten. However, with the smaller capacitor 18 in the input circuit, the circuit exhibits a net gain of unity. This means that all of the high gain characteristic of the amplifier must be absorbed in the external circuit. Under ordinary circumstances this condition would result in intolerable instability in the operation of the amplifier. In the present novel construction, however, such instabilities are avoided. When the larger capacitor 16 is in the input circuit and the system exhibits a net gain of ten, the instability is not present. However, even in this condition, the smaller capacitor 18 is connected across the input to the amplifier 14. Thus, looking back into the junction 20 the amplifier "sees" the impedance of capacitor 56 and the parallel arrangement of the capacitors 16 and 18. When the switch 8 is thrown to connect the smaller capacitor 18 into the input circuit, the larger capacitor 16 is thereby connected across the input of the amplifier 14. In this condition, looking back into the junction 20, the amplifier "sees" exactly the same impedance elements that it saw before. Thus, the total impedance of the input circuit is unchanged by the operation of the switch. However, the reversal of the connection of the two capacitors modifies the attenuation characteristics of the input to the amplifier such that the undesirable instability of the amplifier does not occur, the amplifier gain being absorbed in the attenuation network.

While the switch 8 has been illustrated as being a conventional reversing switch, it will be appreciated that any arrangement capable of accomplishing the desired connections would be suitable.

It may thus be seen that the arrangement presented herein provides a novel controller capable of spanning th entire useful and practical range of both proportional band and reset rate in two overlapping range bands, the range change being accomplished by a simple single-operation switching action. The same single-operation switching action makes a corresponding change in the attenuation of the signal to the amplifier to prevent instability in the operation thereof, the arrangement of the attenuation network being such that the amplifier, looking back from its input. "sees" the same total impedance no matter which way the range switch is thrown. It may also be seen that there has been provided a novel rate circuit which takes advantage of the amplifier gain for its output, obviating the necessity for a separate rate amplifier.

What is claimed is:

1. An electronic controller circuit comprising, in combination, a high gain electronic direct current amplifier having a signal input circuit and an output circuit, a negative feedback loop interconnecting said output circuit and said input circuit in a current summing operational amplifier configuration, said feedback loop including an impedance means responsive to the time rate of change of signals from said amplifier, said impedance means being operative to shunt at least a portion of said signals from said feedback loop as a function of the rate of change of the output signal from said amplifier.

2. An electronic controller circuit comprising, in combination, a high gain electronic direct current amplifier having a signal input circuit and an output circuit, an impedance means serially connected in said input circuit, a negative feedback loop interconnecting said output circuit and said input circuit, an impedance means serially connected in said feedback loop, said input circuit and said feedback loop being connected to said amplifier in a current summing operational amplifier configuration, further impedance means connected in said feedback loop, said further impedance means being responsive to the time-rate of change of signals from said amplifier and operative to shunt at least a portion of said signals from said feedback loop as a function of the rate of change of the output signal from said amplifier.

3. An electronic controller circuit comprising, in combination, a high gain electronic direct current amplifier having an input circuit and an output circuit, a capacitive impedance means serially connected in said input circuit, a negative feedback loop interconnecting said output circuit and said input circuit, a capacitive impedance means serially connected in said feedback loop, said input circuit and said feedback circuit being connected to said amplifier in a current summing operational amplifier configuration, further impedance means including a resistor-capacitor network connected in said feedback loop, said further impedance means being responsive to the time rate of change of signals from said amplifier and operative to shunt at least a portion of said signals from said feedback loop as function of the rate of change of the output signal from said amplifier.

4. An electronic controller comprising, in combination, a high-gain electronic direct current amplifier having an output circuit and a pair of amplifier input terminals, a pair of controller input terminals, one of said controller input terminals and one of said amplifier input terminals being connected to a system common, a negative feedback loop connected between said amplifier output circuit and the other of said amplifier input terminals, a capacitive impedance means connected serially in said feedback loop, an input impedance network connected between the other of said controller input terminals and said other of said amplifier input terminals, said input impedance network including a first and a second capacitive impedance element and means for selectively reversibly connecting one of said capacitive elements in series between said other controller input terminal and said other of said amplifier input terminals and the other of said capacitive elements in shunt across the amplifier input terminals.

5. An electronic controller comprising, in combination, a high-gain electronic direct current amplifier having an output *circuit and first and second amplifier input* [terminal] *terminals,* a first and a second controller input terminal, a negative feedback loop connected between said amplifier output circuit and said first amplifier input terminal, a feedback capacitive impedance element connected serially in said feedback loop, an input impedance network connected between said first controller input terminal and said first amplifier input terminal, said input impedance network including a first and a second input capacitive impedance element and means for selectively interchangeably connecting one of said input capacitive elements in series between said first controller input terminal and said first amplifier input terminal and the other of said input capacitive elements in shunt across said amplifier input terminals, and means connecting said second controller input terminal to said second amplifier input terminal.

6. An electronic controller comprising, in combination, a high-gain electronic direct current amplifier having an output circuit and a first and a second amplifier input terminal, a first and a second controller input terminal, a negative feedback loop connected between said amplifier output circuit and said first amplifier input terminal, a feedback capacitive impedance element connected serially in said feedback loop, an input impedance network connected between said controller input terminals and said amplifier input terminals, said input impedance network including a pair of signal dividing resistors connected serially between said controller input terminals, a variable resistor connected between the junction between said serially connected resistors and said first amplifier input terminal, a first and a second input capacitive impedance element and means for selectively interchangeably connecting one of said input capacitive elements in series between said first controller input terminal and said first amplifier terminal and the other of said input capacitive elements in shunt across said amplifier input terminals, and means connecting said second controller input termial to said second amplifier input terminal.

7. The invention as set forth in claim 6 wherein said feedback capacitive element and said second input capacitive element are of substantially the same capacitance and said first input capacitive element has a capacitance substantially ten times that of said second input capacitive element.

8. The invention as set forth in claim 7 wherein said pair of signal dividing resistors provide a steady-state attenuation of the order of six-to-one.

9. The invention as set forth in claim 6 wherein said feedback loop includes a further impedance means, said further impedance means being responsive to the time-rate of change of signals from said amplifier and operative to shunt at least a portion of said signals from said feedback loop as a function of the rate of change of the output signal of said amplifier.

10. The invention as set forth in claim 6 wherein said feedback loop includes a further impedance means, said further impedance means comprising a resistor-capacitor network responsive to the time-rate of change of signals from said amplifier, said network including a variable resistor serially connected in said feedback loop, and a capacitor connected to shunt at least a portion of said signal from said feedback loop as a function of the rate of change of the output signal of said amplifier.

11. An electronic controller comprising, in combination, a high-gain electronic direct current amplifier having an output circuit and a pair of amplifier input terminals, a pair of controller input terminals, one of said controller input terminals and one of said amplifier input terminals being connected to a system common, a negative feedback loop connected between said amplifier output circuit and the other of said amplifier input terminals, a capacitive impedance means connected serially in said feedback loop, an input impedance network connected between the other of said controller input terminals and the other of said amplifier input terminals, said input impedance network including a first and a second capacitive impedance element and means for selectively reversibly connecting one or the other of said capacitive elements in series between other controller input terminal and said other of said amplifier input terminals.

12. An electronic controller comprising, in combination, a high-gain electronic direct current amplifier having an output circuit and a pair of amplifier input terminals; a pair of controller input terminals, one of said controller input terminals and one of said amplifier input terminals being connected to a system common; said amplifier comprising an electrical signal tranducer operative in response to an electrical undirectional-voltage input signal to produce a corresponding unidirectional current output signal, said transducer including an amplifier section, a positive feedback circuit connected around said amplifier section to produce therein electrical oscillations having an adjustable amplitude, a sensing network forming a part of said positive feedback circuit and including a variable attenuation means to control the amplitude of said oscillations in accordance with the magnitude of the unidirectional-voltage input signal, said variable attenuation means comprising two serially connected unidirectional-voltage sensitive reactance elements each having a connection in common and having separate end terminals, an input circuit for applying unidirectional-voltage signals to said sensing network, said input circuit including a connection from said one of said amplifier input terminals to the end terminals of said elements and a connection from the other of said amplifier input terminals to the common connection of said serially connected elements; said amplifier output circuit including means responsive to the amplitude of said oscillations in said transducer to produce an output current signal in said output circuit corresponding to the magnitude of the unidirectional-voltage input signal; a negative feedback loop connected between said amplifier output circuit and said other amplifier input terminals; a controller input circuit connected between said controller input terminals and said amplifier input terminals, said other amplifier input terminal constituting an operational-amplifier current summing junction between said controller input circuit and said negative feedback loop; said controller input circuit including an impedance network having a capacitive impedance element serially connected between the other of said controller input terminals and said summing junction, a pair of serially connected resistors connected across said controller input terminals and a variable resistor connected from the junction between said serially connected resistors to said summing junction; said negative feedback loop including a capacitive impedance means serially connected therein.

13. An electronic controller comprising, in combination, a high-gain direct current amplifier having an amplifier output circuit and a pair of amplifier input terminals, a positive feedback circuit connected between said amplifier output circuit and said amplifier input circuit to produce electrical oscillations in said amplifier, said amplifier input circuit including a voltage-sensitive variable attenuation network for varying the amplitude of signals from said positive feedback circuit in accordance with applied voltage signals thereby to correspondingly vary the amplitude of said oscillations, said network including voltage-sensitive variable impedance elements and means connecting said elements to said amplifier input terminals, a controller input circuit having a pair of controller input terminals, a negative feedback loop interconnecting said amplifier output circuit and said controller input circuit, a capacitive impedance means serially connected in said negative feedback loop, said controller input circuit and said negative feedback loop being connected to one of said amplifier input terminals at a summing junction in a current summing operational amplifier configuration, said controller input circuit including an impedance network having a capacitive element serially connected between one of said controller input terminals and said summing junction, a pair of resistive impedance elements serially connected across said controller input terminals and a third resistive impedance element connected from the junction between said serially connected resistors and said summing junction, the other of said controller input terminals and the other of said amplifier input terminals being connected to a system common.

*14. An electronic controller circuit comprising, in combination, a high gain electronic direct current amplifier having a signal input circuit and an output circuit, a negative feedback loop interconnecting said output circuit and said input circuit in a current summing operational amplifier configuration, said feedback loop including an impedance means responsive to the time rate of change of signals from said amplifier, said impedance means being operative to shunt at least a portion of said signals from said feedback loop as a function of the rate of change of said signals from said amplifier, said impedance means being further responsive to limit the magnitude of said signals shunted from said feedback loop.*

*15. An electronic controller circuit comprising, in combination; a high gain electronic direct current amplifier having a signal input circuit and an output circuit; a negative feedback loop interconnecting said output circuit and said input circuit in a current summing operational amplifier configuration; said feedback loop including impedance means responsive to the time rate of change of signals from said amplifier; said impedance means being operative to shunt a portion of said signals from said feedback loop as a function of the rate of change of said signals from said amplifier; said impedance means being further responsive to limit the magnitude of said signals shunted from said feedback loop; adjustable impedance means, associated with said impedance means, for adjusting the response of said impedance means to the time rate of change of signals from said amplifier; said impedance means and said adjustable impedance means arranged for retaining the limited magnitude of said shunted signals at said limited magnitude while adjusting the duration thereof.*

*16. An electronic controller circuit comprising, in combination; a high gain electronic direct current amplifier having an input circuit and an output circuit; an impedance means serially connected in said input circuit; a negative feedback loop interconnecting said output circuit and said input circuit; an impedance means serially connected in said feedback loop; said input circuit and said feedback circuit being connected to said amplifier in a current summing operational amplifier configuration; further impedance means connected in said feedback loop; said further impedance means being responsive to the time rate of change of signals from said amplifier and operative to shunt a portion of said signals from said feedback loop as a function of the rate of change of the signals from said amplifier; said further impedance means being re-*

*sponsive to limit the magnitude of said signals shunted from said feedback loop, thereby defining rate amplitude; adjustable impedance means associated with said further impedance means for adjusting the response thereof to the time rate of change of signals from said amplifier, thereby defining rate of time; said further impedance means and said adjustable impedance means arranged for retaining the limited magnitude of said shunted signals at said limited magnitude while adjusting the duration thereof.*

References Cited

The following references, cited by the Examiner, are of record in the patented file of this patent or the original patent.

UNITED STATES PATENTS

| | | | |
|---|---|---|---|
| 2,779,921 | 1/1957 | Hawes | 328—132 X |
| 2,887,642 | 5/1959 | Ehret et al. | 318—448 |
| 2,939,066 | 5/1960 | Crenshaw | 318—448 |
| 2,949,233 | 8/1960 | Fogarty | 330—103 X |
| 3,017,749 | 1/1962 | Heppler et al. | 330—10 X |
| 2,693,568 | 11/1954 | Chase. | |
| 2,825,023 | 2/1958 | Marantette. | |
| 2,956,234 | 10/1960 | Olsen. | |

JOHN F. COUCH, *Primary Examiner.*

A. D. PELLINEN, *Assistant Examiner.*

U.S. Cl. X.R.

328—132; 330—75; 318—448